United States Patent [19]
Burg

[11] Patent Number: 4,587,918
[45] Date of Patent: May 13, 1986

[54] FINE ENTRY AIR RIDE BOAT HULL

[76] Inventor: Donald E. Burg, 15840 SW. 84 Ave., Miami, Fla. 33157

[21] Appl. No.: 584,728

[22] Filed: Feb. 29, 1984

Related U.S. Application Data

[63] Continuation-in-part of Ser. No. 737,403, Nov. 1, 1976, Pat. No.

[51] Int. Cl.$^4$ .............................................. B63B 1/38
[52] U.S. Cl. ..................................... 114/67 A; 440/38
[58] Field of Search ................... 114/67 A, 288, 289, 114/290, 56, 291, 285–287; 440/69, 70, 38

[56] References Cited

U.S. PATENT DOCUMENTS

| | | | |
|---|---|---|---|
| 1,835,564 | 12/1931 | Grayson et al. | 114/290 |
| 2,005,473 | 6/1935 | Sanden | 114/67 A |
| 2,231,296 | 2/1941 | Sartori | 114/291 |
| 2,234,899 | 3/1941 | Higgins | 114/67 A |
| 3,140,687 | 7/1964 | Beardsley | 114/67 A |
| 3,146,752 | 9/1964 | Ford | 114/67 A |
| 3,148,652 | 9/1964 | Canazzi | 114/56 |
| 3,183,878 | 5/1965 | Aschauer | 440/38 |
| 3,331,347 | 7/1967 | Von Heidenstam | 114/67 A |
| 3,473,503 | 10/1969 | Gunther | 114/67 A |
| 3,476,069 | 11/1969 | Mantle et al. | 114/67 A |
| 3,477,400 | 11/1969 | Walker | 114/289 |
| 3,547,064 | 12/1970 | Glass | 114/289 |
| 3,581,696 | 6/1971 | Ilon | 114/285 |
| 3,698,343 | 10/1972 | Boome | 114/285 |
| 3,702,598 | 11/1972 | Szptyman | 114/67 A |
| 3,726,246 | 4/1973 | Wukowitz | 114/67 A |
| 3,742,888 | 7/1973 | Crowley | 114/67 A |
| 3,800,725 | 4/1974 | L'Heureux | 114/288 |
| 3,937,173 | 2/1976 | Stuart | 440/69 |
| 4,029,036 | 6/1977 | Magnuson | 114/67 A |
| 4,046,217 | 9/1977 | Magnuson | 114/67 R |

Primary Examiner—Sherman D. Basinger
Attorney, Agent, or Firm—Robert J. Van Der Wall

[57] ABSTRACT

An improved performance marine surface vessel with one or more recesses that intersect the hull substantially beneath the waterline thereof, the recess bounded by stabilizing, planing, catamaran-like sidehulls with bow shaped members located at its forward and aft portions and optionally therebetween, with the recess being supplied with pressurized gas to maintain a lift-augmenting, restrained pressurized gas layer under the hull that improves load-carrying capability, efficiency and ride quality. The keels of the sidehulls diverge for at least a portion of their length. The fore and aft bow shaped members, and optional intermediate bow sections in some cases, contact the water like small bow sections thereby improving hull ride and handling characteristics and reducing gas leakage. The bow shaped members, along with the catamaran-like sidehulls, provide gas flow restriction, sure tracking and turning characteristics when underway in any type of sea and proper hull attitude and trim without wallowing at low speeds or yaw, roll or pitch instability at high speeds even if the pressurized gas supply is wholly or partially inoperative. The diverging sidehull keels are important to the effectiveness of the invention in allowing narrow or fine entry forward with resulting improved ride characteristics and reduced gas leakage forward over earlier versions of the inventive hull. Further features of the invention are optional anti-skid skegs that may incorporate high aspect ratio water inlets for waterjet propulsors and controllable gas recess pressure distribution means to assist hull trim control under all conditions.

31 Claims, 22 Drawing Figures

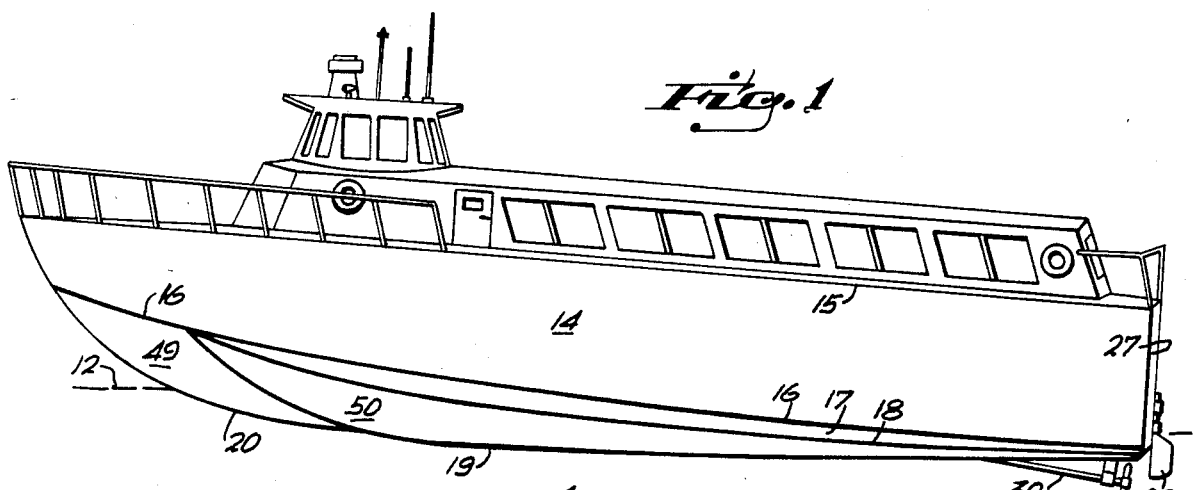
Fig. 1
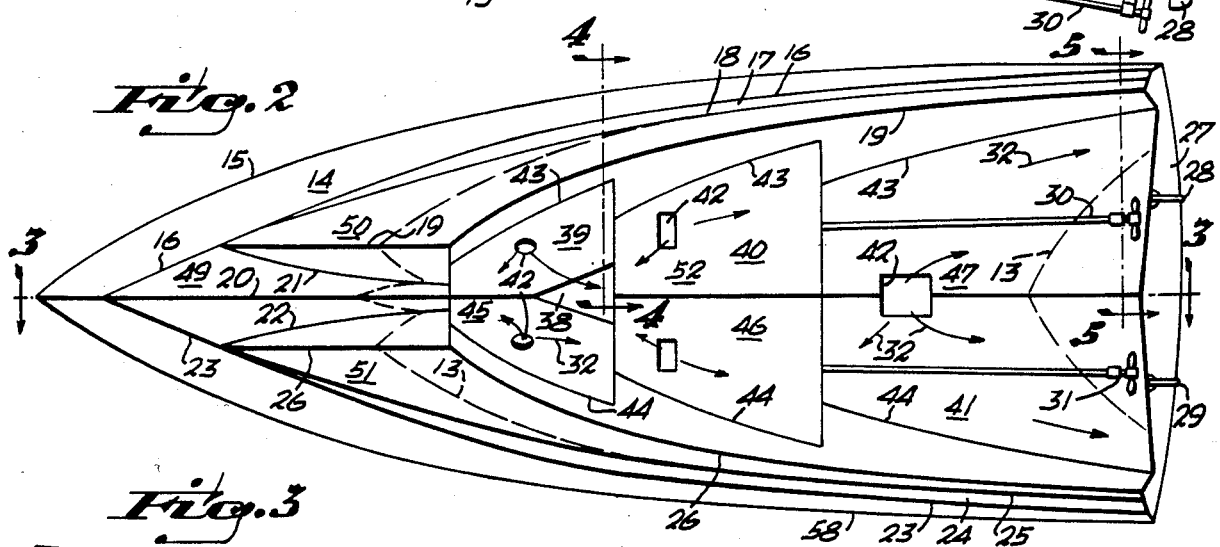
Fig. 2
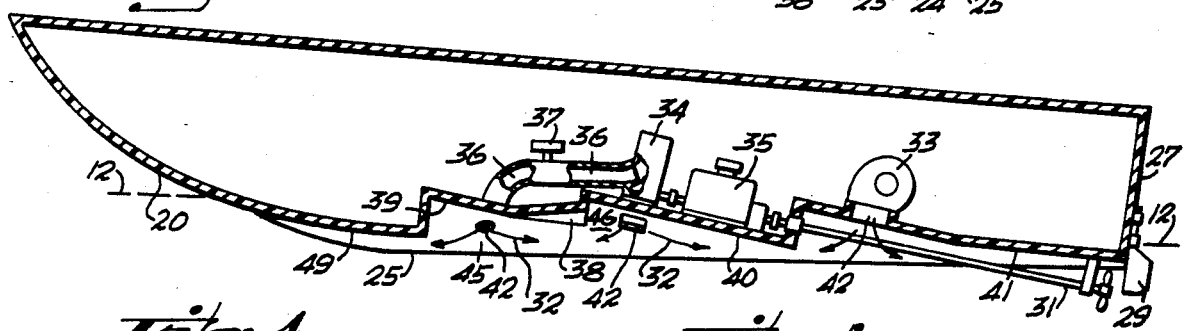
Fig. 3
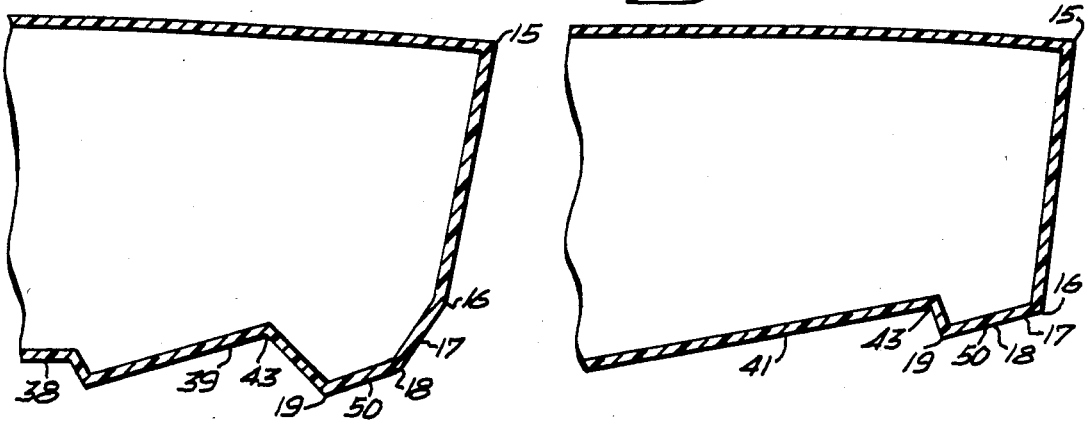
Fig. 4
Fig. 5

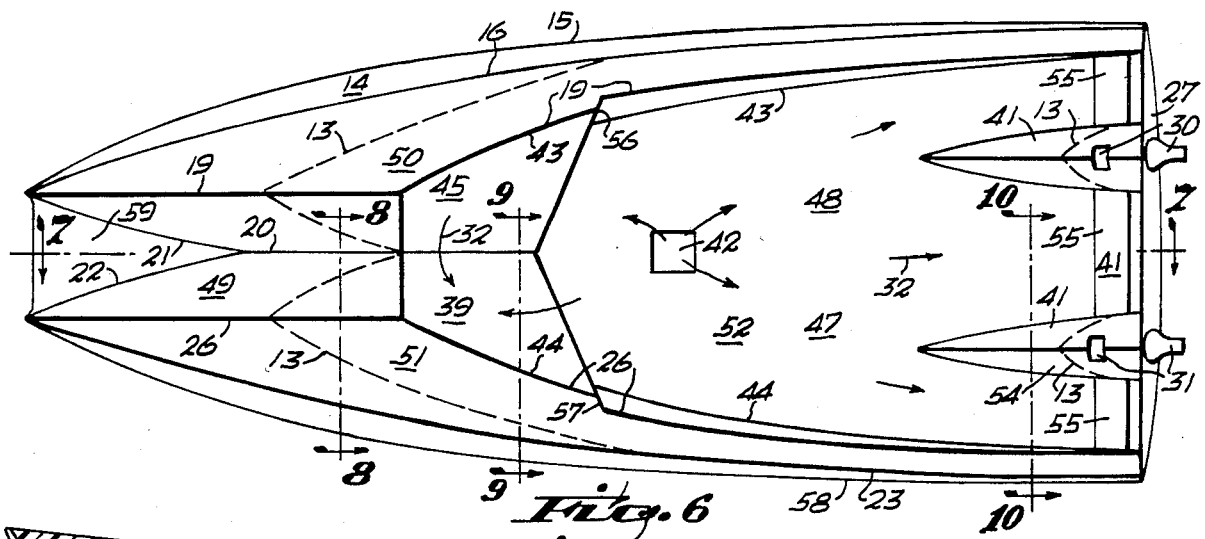
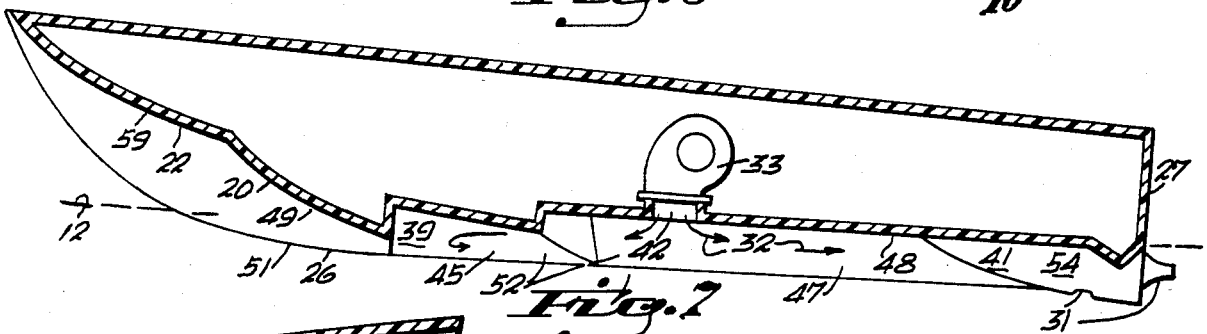
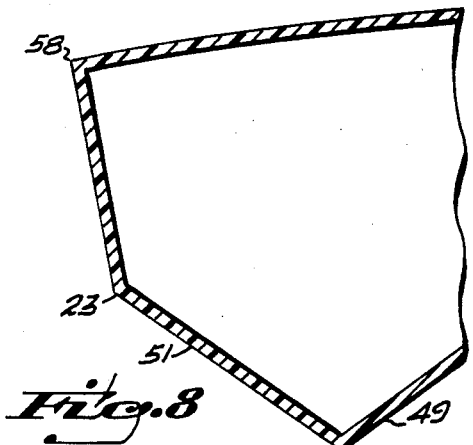
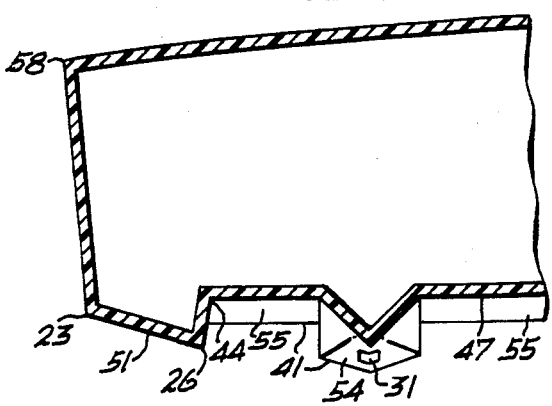
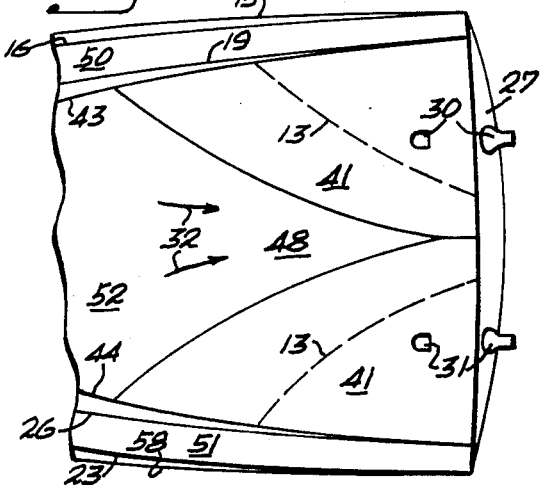

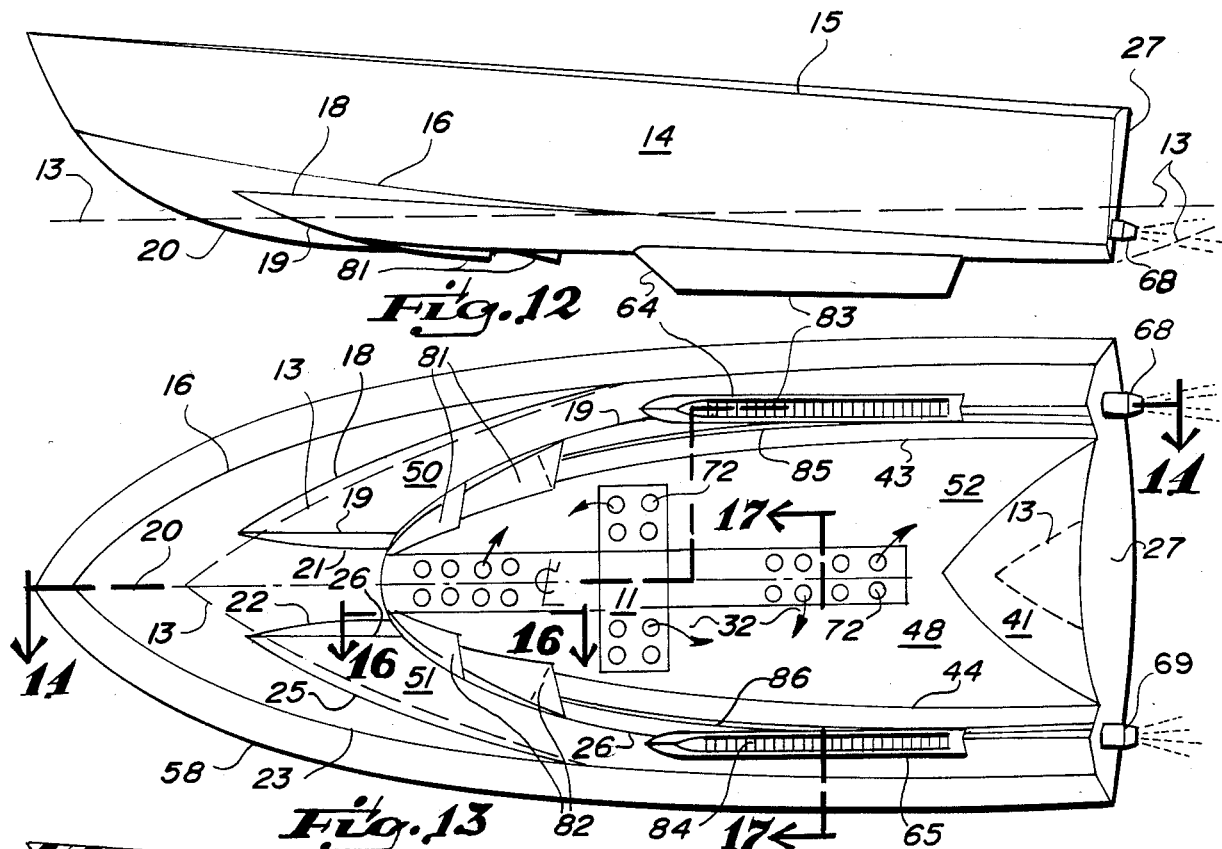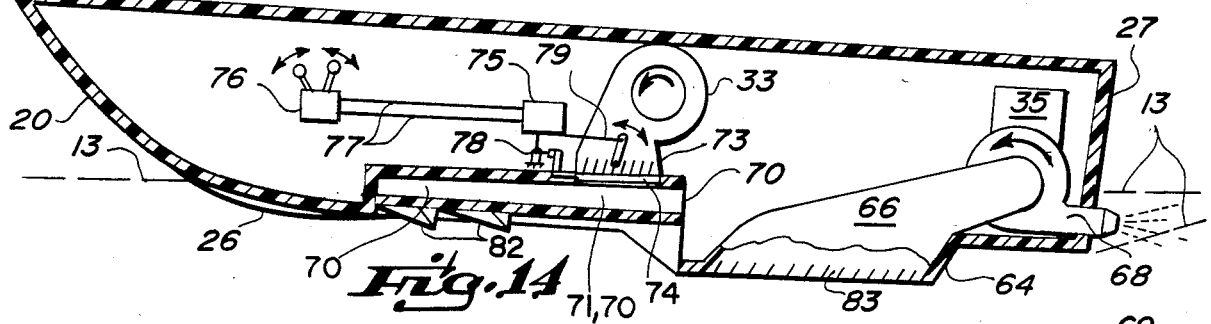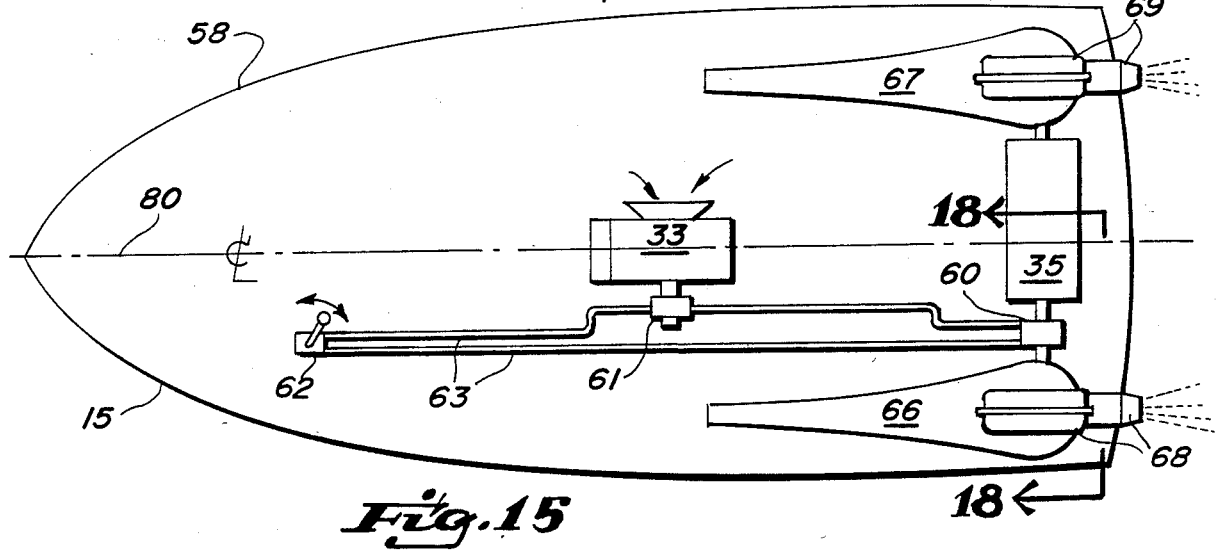

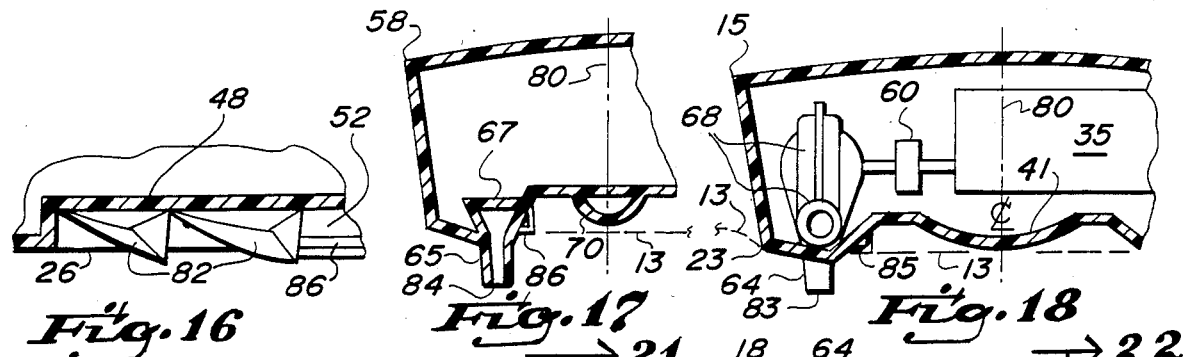
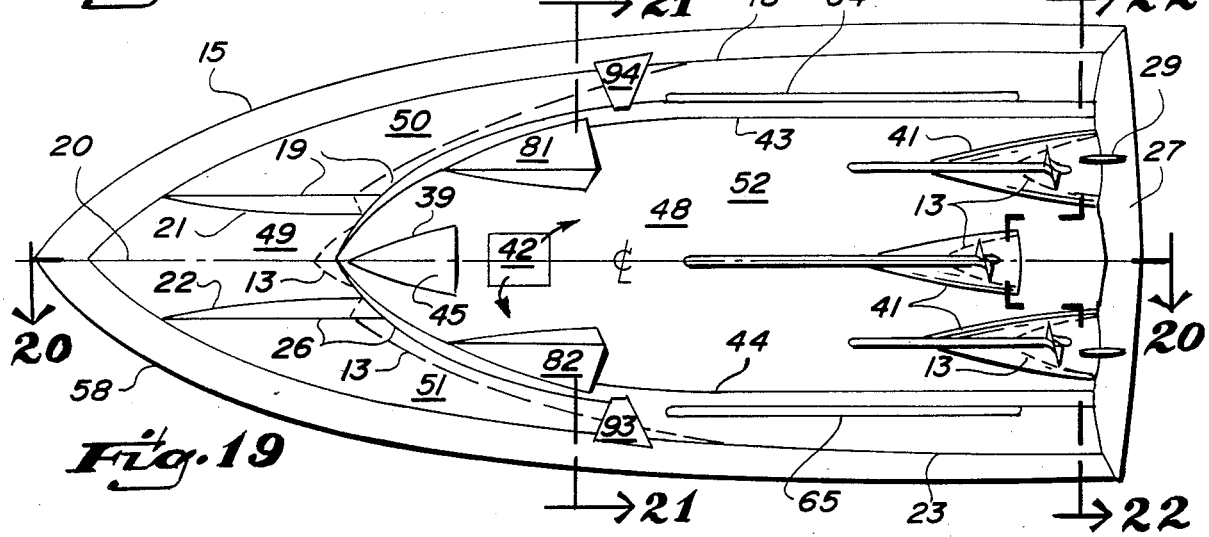
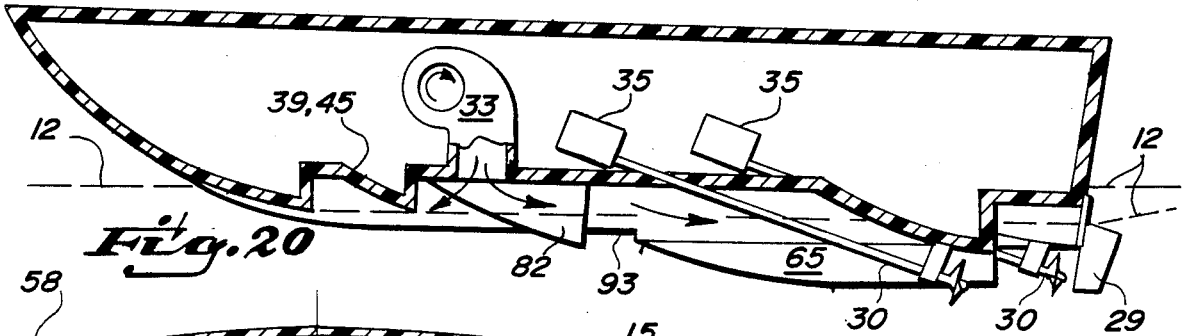
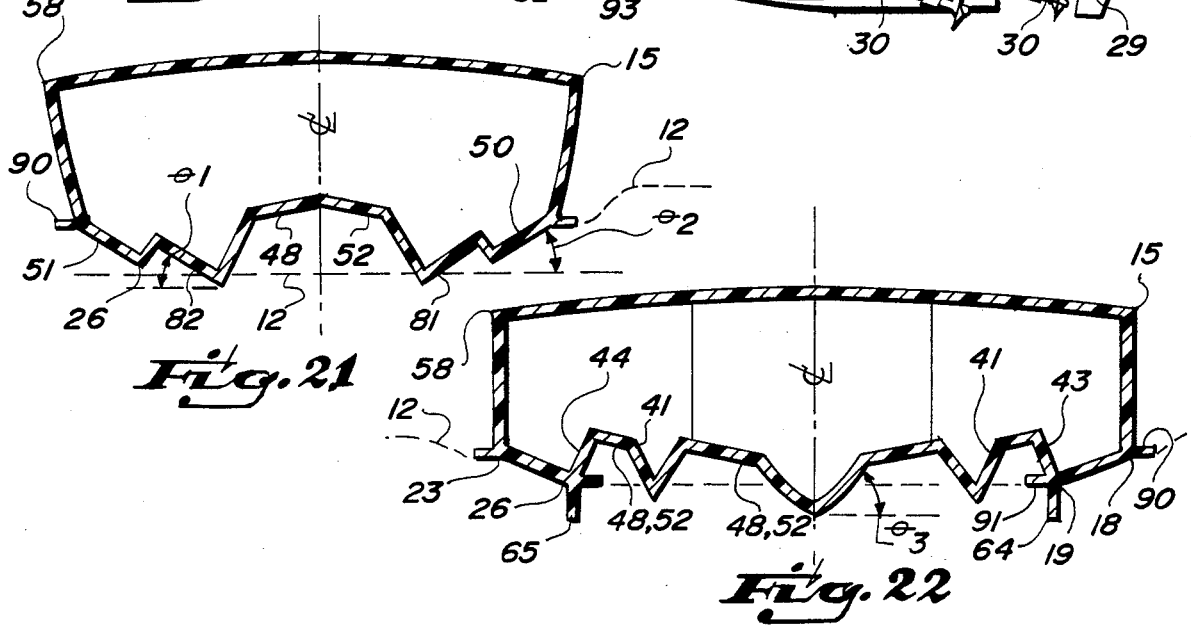

FINE ENTRY AIR RIDE BOAT HULL

CROSS REFERENCE TO OTHER APPLICATIONS

This application is a continuation-in-part to applicant's earlier applications, Ser. No. 737,403 filed Nov. 1, 1976, now abandoned; Ser. No. 818,303 filed July 25, 1977, now U.S. Pat. No. 4,165,703 issued Aug. 28, 1979; Ser. No. 069,771 filed Aug. 27, 1979, now abandoned; Ser. No. 207,789 filed Nov. 17, 1980, now abandoned; Ser. No. 269,908 filed June 3, 1981, now U.S. Pat. No. 4,392,445 issued July 12, 1983; Ser. No. 289,769 filed Aug. 3, 1981, now abandoned Ser. No. 343,287 filed Jan. 27, 1982, now abandoned; Ser. No. 458,738 filed Jan. 17, 1983 now abandoned; Ser. No. 465,670 filed Feb. 10, 1983; and International Application No. PCT/US83/01067 filed July 11, 1983 now WO85/00332.

BACKGROUND OF THE INVENTION

This invention is a continuation to and a refinement over applicant's earlier patent efforts in this area as generally titled "Air Ride Boat Hull". As in all of the others, it involves the introduction of pressurized gas in one or more recesses under a boat hull to augment hull lift and thereby improve hull load carrying capability, efficiency, ride quality and speed. Of particular focus in this continuation is the development of diverging sidehull keels which contribute to ride quality and reduce gas leakage forward without sacrificing the other aspects of the invention as taught by other disclosures made by the inventor.

The recess is bounded by bow shaped members at its forward and aft portions, and optionally, therebetween, and by stabilizing, planing, catamaran-like sidehulls, whose keels diverge over at least part of their length. The combination of these elements gives the aforementioned performance advantages over conventional hulls while offering operation, costs, and aesthetic advantages over other pressurized air hull craft. The invention described herein handles much like conventional hulls with the pressurized gas supply either "on" or "off" costs the same or only slightly more to manufacture and maintain than conventional hulls and offers generally the payload space, while maintaining essentially the same above-water aesthetics as conventional hulls.

Tests have shown that the secondary bow-shaped members, while in some cases adding slightly to overall vehicle drag, provide excellent ride and tracking characteristics and improved gas retention means since the aft bow-shaped member, and optionally, any intermediate bow shaped member if so designed, actually rides in the water like a small boat bow section.

The idea of introducing air or other gases at ambient or higher pressures under boat hulls is not new in basic concept and patents have been issued on several approaches. Only a few of the more sophisticated developments have met with any commercial success. However, due to their complex structural requirements and elaborate flexible seals they remain too expensive or impractical for general marine applications. The only example of the latter that has any applicability here is the Surface Effect Ship (SES) as it is known in the United States. The SES is an outgrowth of the success of the Ground Effect Machine (GEM) as first made workable by Christopher Cockerell over two decades ago in England. The GEM is totally supported by an air cushion and has flexible seals around its full periphery. As such it is truly amphibious and has little relationship to this invention.

The SES is a substantially rectangular shaped platform with widely spaced, deep vertical side members that extend downward from the main platform. The side members are connected fore and aft by full span flexible seals or flaps, and the deep wave clearing chamber thus defined is pressurized with air. The SES requires substantially less chamber air flow and therefore less fan power than the GEM but is limited to a marine environment. The SES is capable of very high speeds, offers a smoother ride than conventional craft due to proportionally thin side members and the flexibility of the seals, and is significantly more efficient than conventional craft due to the minimum wetted area. The SES offers much potential as a military and commercial craft notwithstanding its high initial cost, deep static draft due to the vertical side members, inherently high stress structure and high maintenance flexible seals. The U.S. Navy has extensively tested SES prototypes including two 100 ton craft and is presently working on designs of SES's of 3000 tons and more. Also, recent commercial SES ventures appear promising but are reported to be several times as expensive as equivalent size conventional hulls.

Some patents related to the SES and some of its variations include one that utilizes large flap-like seals, Ford, U.S. Pat. No. 3,146,752. More appropriate to current SES technology are Beardsley, U.S. Pat. No. 3,140,687, and Mantle, et al., U.S. Pat. No. 3,476,069. These latter examples use the more flexible fabric type seals. The most extreme variation appears to be Gunther, U.S. Pat. No. 3,473,503, who describes an attempt at an amphibious SES type craft that has surface-contacting, flexible, vertical, side members as well. In any case, all of the aforementioned craft differ substantially from the invention in that they use flexible or flap-like seal members fore and aft (as opposed to the substantially rigid structure of this invention), devote much usable hull space to the air chamber to allow wave clearance between the side members, and deviate widely in appearance from conventional marine craft. They also have been reported to suffer from instability problems, particularly in small size craft.

Crowley, U.S. Pat. No. 3,742,888, attempts to resolve admitted instability problems by incorporating discrete pressurized air chambers around the periphery of the hull. His theory is that as one of the high pressure peripheral chambers submerges, its pressure increases further while its opposite member loses pressure thereby causing a hull righting moment. In any case, his is an ungainly and assuredly rough riding craft that compromises the majority of useful hull space. It is primarily concerned with resolving particular instability problems related to the design which offers little resemblance to conventional marine craft and requires the high pressure peripheral chambers for any degree of stability. Continuous pressurization with Crowley's design is essential, and deep draft at rest results.

One more approach is that of Wukowitz, U.S. Pat. No. 3,726,246, who has a ram air inlet in the forward end of the hull that supplies air to a divergent channel under the hull. It will be noted that Wukowitz does not teach that catamaran sidehulls extend downwardly from the main hull as in the principal embodiment of this invention. His divergent channel is actually a chamber inset into the hull absent any sidehulls, which divergent channel converts the dynamic energy (pressure) of the air to static pressure, according to Bernoulli's Theorem, and thus increases lifting pressure. In his application of Bernoulli's principle, Wukowitz does not and cannot teach means to seal the aft end of his channel. As a result, little lift would be provided even if the forward ram air inlet were to be supplemented by artificial means. The lack of means to restrain the air at the aft end of the channel makes the approach of Wukowitz impractical to meet the accomplishments of the present invention.

Another approach that deviates far afield from more conventional aspects of marine design is given by Szptyman, U.S. Pat. No. 3,702,598, who offers a tunnel hull with an aerodynamic lifting surface that receives ram air from a forward opening in the air chamber that can be supplemented by artificial means. This craft can only realize reasonable chamber lift values at very high speeds where ram air pressure is sufficient to maintain high chamber pressures. Also, Szptyman's invention bears little aesthetic resemblance to conventional marine craft.

There have also been attempts to inject air under hulls of more or less conventional form. Patents that exist in this area are Glass, U.S. Pat. No. 3,547,064, and Von Heidenstam, U.S. Pat. No. 3,331,347. There is a major difference between their patents and this invention in that they place an air layer under the hull that cannot be maintained at any lift-providing pressure since there is insufficient structure on the sides of the layer to do so.

There are also conventional hull forms that offer underwater cavities or tunnels of various types. Some of them include Grayson, et al., U.S. Pat. No. 1,835,564, Stuart, U.S. Pat. No. 3,937,173, Walker, U.S. Pat. No. 3,477,400, Higgins, U.S. Pat. No. 2,234,899, and Sartori, U.S. Pat. No. 2,231,296. None of these patents show a pressurized restrained air or gas layer under the hull even though several show cavities in the hull of one type or another. They must be considered variations of more or less standard hull forms without benefit of a pressurized gas lifting force that is confined by structure, which is a primary object of this invention.

As noted above, the present invention is a derivation from applicant's other inventive efforts with improved performance marine surface vessels that are in part supported by a pressurized gas layer structurally trapped and restrained beneath the hull. Actual test results utilizing a forty-two foot craft built in this manner show the viability of this concept. The test vehicle, a forty-two by fifteen foot welded aluminum craft has achieved in actual practice substantial efficiency improvements as compared to conventional hull forms. Based on the test results, it can be said that, in moderate and heavy load carrying applications, conventional hulls will generally require from fifty to one hundred percent more power at planing speeds than a hull with concepts embodied in applicant's prior inventions in this area. Additionally, the air ride invention normally realizes at least a thirty percent speed advantage. These performance advantages are similar to those experienced by the complex and vastly more expensive SES described above.

Since the bottom line on any commercial venture is cost, it should be considered that a one hundred ten foot off-shore oil industry crew and supply boat built to a conventional design would cost about 1.2 million dollars while a one hundred ten foot SES is in the four million dollar cost range. A one hundred ten foot air ride vessel built according to the present invention would cost thirty percent more than the conventional hull or about 1.6 million dollars. The air ride's higher speed and greater payload capability will pay back any of the cost difference between it and the conventional hull normally within the first year of operation. The difference between the 4 million dollar cost of a one hundred ten foot SES and the 1.6 million dollars for a one hundred ten foot vessel built according to the present invention is enough to cover fixed operating expenses less depreciation of the present invention for over fifteen years.

SUMMARY OF THE INVENTION

With the foregoing in mind, it is the principal object of the present invention to provide a marine surface vessel with extraordinarily smooth ride qualities and significant load-carrying, efficiency and speed improvements compared to conventional hulls while also maintaining low stress and therefore low cost hull structure, shallow draft, flexibility of propulser location, narrower beam, and much more useful hull space when compared to the SES type craft.

Another primary object of the invention is to furnish the foregoing objects and advantages while retaining the above-water aesthetics and handling characteristics of conventional hull forms.

One more principal object of the invention is to provide a hull which offers very nearly the same low manufacturing and maintanance cost as conventional hulls while offering the foregoing advantages.

Similarly, a related object of the invention is to offer an inherently strong structure that is more stable when quiescent in comparison to conventional hulls.

Another object of the invention is to offer improved efficiency and speed without significantly affecting the dynamic draft or internal hull space of comparably sized conventional craft.

Another principal object of the invention is to provide a hull with diverging catamaran sidehull keels which provides a finer entry forward with resultant better ride qualities and less gas leakage forward.

One more object is to provide a means to alter hull trim and ride qualities by controlling pressure distribution in the recess.

Yet another object is to provide a means to prevent skidding while turning that can optionally be combined with low drag waterjet propulsor inlets.

One more object of the invention is to offer the preceeding objects and advantages with changes that do not significantly affect draft of the hull when quiescent, and which will not cripple or seriously hamper use of the vessel if the pressurizing means of the invention are not in use or temporarily rendered inoperative.

Other objects and advantages of the present invention will become apparent from the following descriptions and claims and from accompanying drawings.

In accordance with the present invention there is disclosed an improved performance marine surface vessel with at least one recess that intersects the hull substantially beneath the static waterline thereof, the recess enclosed by stabilizing, planing, catamaran sidehulls whose keels diverge, with generally bow shaped members located at its fore and aft portions and optionally therebetween. When pressurized air or any other gas is supplied to the recess thus defined, hull lift capabilities are augmented with resulting significant performance gains. Even if the pressurized gas supply is rendered wholly or partially inoperative or if the hull is operated in extreme rough seas where some decay of gas pressure in the recess on an average basis can be expected, this invention makes for a hull that will perform substantially as well as or better than a similarly loaded conventional hull. The result is a significant advantage over other attempts at pressurized air hull craft that would generally have to wallow along at low speeds under rough sea conditions. Therefore, the present invention provides a craft that is very resistant both to yaw, roll, or pitch instabilities at high speeds, or to wallowing at low speeds, with the gas supply either "on" or "off", and regardless of sea roughness.

The bow shaped members not only act as gas flow restrictors, but also add substantially to hull structural integrity and seaworthiness. In the design of the more desirable longer finer hull shapes it is advantageous to locate several bow shaped members athwartships of and interspaced down the length of the recess that impact with the irregular water surface during rough sea operation. This maintains a series of gas chambers down the length of the hull, that may be interconnected and/or individually pressurized, and minimizes water impact with the underside of the rather shallow recess itself. The bow shaped members are downwardly extending and may have any shape such as inverted-V, V, rounded, W, partially flat or the like, with the inverted-V being a preferred embodiment because of its simplicity of construction, inherently strong structural characteristics, and good ride qualities.

Additional bow members interspaced inside the recess are normally desirable, particularly toward the front portion of the recess, where they aid forward flow gas sealing, They can be used to create more than one recess, with the resultant benefit that partial or complete pressure loss in the forward recess or recesses is not noticeably experienced by the rearmost recesses even in a rough sea. The result is a significant reduction in partial recess repressurization time.

Optional gas passageways act as flow control orifices to insure that the main gas supply recess reaches maximum pressure first in the event of pressure loss for any reason. Of course, it is the intent of this invention that any or all gas recesses can be individually pressurized if desired. It is also the intent of the present invention that any intermediate bow shaped members do not require water contact, at least during calm water operation.

The use of diverging keels on the catamaran sidehulls has proven to be very effective and valuable on air ride test craft and is the preferred embodiment for this hull also. As an example, on the 42 foot air ride test craft the catamaran sidehull keels are some six feet apart at the forward end of the recess and twelve feet apart aft. This means less gas flow leakage forward and narrower or finer entry forward which contribute to the exceptional ride qualities of these craft, although the 42 foot air ride test craft had sidehull keels that diverged by one hundred percent, smaller divergence values may be desirable in some instances. This is particularly true when the catamaran keels are widely spaced forward to give better high speed stability. Therefore, sidehull keel divergence values as small as fifty percent are considered feasible.

The catamaran sidehulls employ non-trip chines in their preferred embodiment that aid stability in turns. The 42 foot air ride test craft can negotiate a full 180° turn in less than a 200 foot radius while traveling at an estimated 25 mph. Banking characteristics in a turn are similar to a conventional semi-V hull with the outboard chine higher than the inboard chine. The use of non-trip chines on the catamaran sidehulls contributes to these good handling characteristics.

When under the hull propulsors are located as shown in the drawings, a sub-cavitating propeller in this instance, the wetted bow section adjacent to the propulsor insures clean gasfree water to the propulsor since a gas layer does not exist directly above the propulsor as gas is directed to either side of the aft nonplanar bow shaped members. This concept also lends itself well to the installation of waterjet propulsor inlets in the wetted portions of the non-planar bow shaped members. In the case of multi-engine installations more than one aft bow shaped member may be utilized in side by side arrangement if desired. Of course, propulsors may be located under or adjacent to the catamaran sidehulls or below air surfaces. The latter requires deep submergence of propellers or structure to prevent air aspiration and is subject to the effects of turbulence and wave action.

In some conditions, the air ride hull may skid sideways when negotiating a high speed turn unless optional skegs are provided. These skegs may also incorporate inlets for waterjet propulsors thereby resulting in an efficient low drag system that also provides gas free water to the waterjet propulsors.

Another optional feature is the use of spray rails on the recess side of the catamaran sidehulls. These spray rails reduce drag by preventing water from climbing up the inside surface of the sidehull. This also contributes to vehicle stability by preventing high side loading due to inside sidehull wetting.

The invention will be better understood upon reference to the drawings and detailed description of the invention which follow in which:

BRIEF DESCRIPTION OF THE DRAWINGS

FIG. 1 is a side view of a typical boat hull that employs the invention showing its resemblance to more conventional hulls.

FIG. 2 is a bottom view of a boat hull with the invention showing catamaran-like load-carrying sidehulls, expanding catamaran sidehull keels, pressurized gas recesses, gas inlet ports, typical propulsor and rudder installations, and the dynamic sea hull waterlines.

FIG. 3 is a longitudinal centerline cross section of the boat hull taken along line 3—3 of FIG. 2 and showing gas pressurizing means, propulsor engine with propeller and rudder, gas recesses, and sections of forward, secondary and aft bow members including a gas passageway in the first secondary bow member.

FIG. 4 is a transverse port side cross section of a boat hull with the invention taken along line 4—4 of FIG. 2 and showing load carrying catamaran sidehull with non-trip chine, first secondary bow member, and gas flow passageway in bow member.

FIG. 5 is a transverse port side cross section of a boat hull with the invention taken along line 5—5 of FIG. 2 and showing load carrying catamaran sidehull with blended into sidehull non-trip chine and aft bow member.

FIG. 6 is a bottom view of an alternative embodiment of the invention with load carrying catamaran-like sidehulls intersecting in inverted-V bow arrangement forward, expanding catamaran keels that include an outward step that enlarges recess width at the aft end of the first secondary bow member, pressurized gas recesses, gas inlet ports, aft bow members with integral waterjet propulsors, and typical dynamic calm sea hull waterlines.

FIG. 7 is a longitudinal centerline cross section of the boat hull taken along line 7—7 of FIG. 6 and showing gas pressurizing means, forward main keel intersection of catamaran sidehulls, secondary and aft bow members, and waterjet inlet and discharge in aft bow member.

FIG. 8 is a transverse starboard side cross section of a boat hull with the invention taken forward of the recess and along line 8—8 of FIG. 6 showing the load carrying catamaran sidehull keel and outer chine and the inverted-V center bow section.

FIG. 9 is a transverse starboard side cross section of a boat hull with the invention taken in the first recess and along line 9—9 of FIG. 6 and showing the load carrying catamaran sidehull keel and outer chine and an inverted-V secondary bow member.

FIG. 10 is a transverse starboard side cross section of a boat hull with the invention taken through the recess aft bow members and along line 10—10 of FIG. 6 showing load-carrying catamaran-like sidehull, aft recess floor, aft bow members, and waterjet propulsor inlet in an aft bow member.

FIG. 11 shows an alternative embodiment with inverted-V aft bow member, dynamic calm sea waterlines on aft bow members, load-carrying catamaran-like sidehulls with diverging keels, and typical waterjet propulsor installations.

FIG. 12 is a side view of an alternative embodiment of the inventive hull that shows a special anti-skid skeg that extends downward from the hull and portions of steps that are located primarily inside the recess.

FIG. 13 is a bottom view of the hull of FIG. 12 showing waterjet inlets incorporated into the anti-skid skegs, gas flow distribution ducts, steps, aft sealing bow member, spray rails, and dynamic calm water wetted waterline on the hull.

FIG. 14 is a longitudinal cross sectional view taken through line 14—14 of FIG. 13 that shows port waterjet inlet and pump and blower and gas distribution systems including flow directing vanes that are in turn optionally controlled by a gyroscope input feedback control system.

FIG. 15 is a top view of the hull of FIG. 12 showing the vertical hull centerline and general layouts of the main engine, waterjet propulsors and inlet ducts, blower, and drive systems for the blower.

FIG. 16 is a longitudinal starboard side broken partial cross section view taken through line 16—16 of FIG. 13 and shows steps located primarily inside the recess.

FIG. 17 is a broken partial transverse starboard side view taken along line 17—17 of FIG. 14 showing a portion of the gas ducting system and of the waterjet inlet system as well as the vertical centerline plane of the hull, spray rails and waterlines.

FIG. 18 is a broken partial transverse port side view taken along line 18—18 of FIG. 15 that shows a portion of the aft sealing bow member, vertical centerline plane of the hull, and waterjet propulsor, blower drive system, and main engine installation arrangements.

FIG. 19 is a bottom view of a hull of the invention showing catamaran sidehulls, a secondary bow member located proximal the pressurized gas recess, downwardly extending planing steps, side skegs located either side of gas recess, and multiaft gas sealing bow members that in total width, span at least 5 percent of recess width.

FIG. 20 is a centerline cross sectional view of the boat hull of FIG. 19 showing engines, blower, pressurized gas recess, planing step, secondary bow, recess side skegs and aft gas sealing bow members.

FIG. 21 is a vertical transverse view of the hull of FIG. 19 taken across a forward portion of the pressurized gas recess. This view shows the planing surface angles of the planing steps and catamaran sidehulls.

FIG. 22 is a vertical transverse view of the hull of FIG. 19 taken through an aft portion of the pressurized gas recess and through the aft gas sealing bow members. This figure clearly shows a typical planing surface angle of a gas sealing bow member. It also shows spray rails either side of each sidehull.

DETAILED DESCRIPTION

With reference to each of the aforementioned figures in turn, and using like numerals to designate similar parts throughout the several views, a preferred embodiment and several alternative embodiments will now be described.

FIG. 1 discloses a motorboat with the inventive hull 14 which illustrates the above-water resemblance to conventional hull forms. A forward bow member 49 intersects with downwardly. extending port side planing catamaran-like sidehull 50 in this preferred embodiment. The port side sheer line 15, outer chine 16, non-trip chine 17, inner chine 18, catamaran sidehull keel 19, propeller and shaft 30, and rudder 28 are also shown. It will be seen from the drawing that catamaran sidehull keel 19 digresses from a vertical plane. Other items include main keel 20, dynamic calm sea waterline 12, and transom 27.

FIG. 2 discloses the bottom view of a motorboat with the inventive hull 14 with a main recess 52 defined around its periphery by forward bow member 49, catamaran-like planing stabilizing sidehulls 50 and 51, and aft V-shaped bow member 41. The plane of line 3—3 is the vertical centerline plane of the hull and the planes of lines 4—4 and 5—5 are portions of vertical transverse planes of the hull which are perpendicular to the vertical centerline plane of the hull. Obviously, all planes parallel to the planes containing lines 4—4 and 5—5 are also transverse planes. The aft bow member 41 need not be located at the transom 27 and the forward bow member 49 need not extend forward of the planing catamaran-like sidehulls 50 and 51. The forward bow member 49 may assume any bow shape, in this case it is a standard V-shape at its forward end that becomes a W shape, as defined by catamaran keels 19 and 26 along with hull intersect lines 21 and 22 and main keel 20, at the front of the main recess 52. Incidentally, hull intersect lines 21 and 22 illustrate the downwardly extending nature of the catamaran sidehulls in the preferred embodiment of this invention. The main recess 52 thus defined is purged of water by gas supplied through a gas supply duct or ducts 42 resulting in substantial performance improvements while underway. The hull lift-augmenting force realized from the gas in the main recess 52 improves hull ride quality and efficiency. The gas flow arrows 32 show the general direction of recess gas flow and the hull waterline 13 outlines the wetted hull area during dynamic calm sea operation. The lowermost water contacting portion of aft bow member 41 is outlined by waterline 13 and extends over much of the angled width of the aft bow 41. The lowermost water contacting portions of aft bow member 41 require at least one surface that is at an angle exceeding 5 degrees and less than 50 degrees with a line perpendicular to the vertical centerline plane of the hull as measured in a transverse plane of the hull where portions of said surface and said line intersect. Angles of at least 5 degrees over much of the water contacting portion of the aft bow 41 are required to reduce water impact loads or slamming that would be experienced in the mostly horizontal flat surfaces that are used by the other art. Use of angled surfaces exceeding 50 degrees over much of the lowermost water contacting portions of the aft bow 41 appears impractical as angles exceeding 50 degrees would provide poor gas sealing and little lift along with high drag.

Therefore, fifty degrees is considered a maximum where reasonably good planing efficiencies, 45 percent or so, can still be realized (see a subsequent paragraph for a discussion of planing lift efficiencies). This range of angles, 5-50 degrees, results in good planing lift efficiencies, reasonable good to excellent ride qualities, and at least partial water contact to reduce gas flow leakage aft. Mostly flat or horizontal, as seen in a vertical transverse plane of the hull, aft seal surfaces, as used in the prior art, offer superior planing lift efficiencies at the expense of the other important items. It is interesting that the wide essentially horizontal lower surfaces of SES aft seals normally ride above the water surface by some distance, some one and one half feet or so is the design goal for a future 3000 ton Navy SES, which at least partially accounts for the high air flow rate requirements of these craft and other partially air supported craft with a horizontal aft seal such as the prior art.

The angled portions of the aft bow member of the present invention need not span the full width of the bow member as the critical impact areas are normally at or near the water contacting portions. Therefore, with the 5-50 degree angled surface limitation, it can be stated that an aft bow member that is angled over at least 25 percent of the recess width would be acceptable (Note that "average recess width" as herein defined is the width between recess boundary waterlines on boat structure averaged over recess length. If there are any breaks in the recess boundary waterline, such as might be caused by a hole or vent in a sidehull at the waterline, the waterline is considered to be on a straight line between the waterlines on boat structure either side of said break in the recess boundary waterline). Since the aft gas sealing bow member can be composed of one or more bow members that can be staggered slightly fore and aft, such as the aft bow 41 shown in FIG. 6, as well as side to side, it is necessary to define a means of measuring the aft bow member surface angles. These angles are measured in one or more vertical transverse planes of the hull that intersect the aft bow members and do not overlap each other across any longitudinal vertical plane parallel to the vertical centerline plane of the hull. Therefore, these vertical transverse planes may be staggered, but their total width shall not exceed the maximum outside width of the aft bow members.

There are several factors that contribute to the Air Ride concept's significantly greater stability compared to the prior art. The first of these is an upper limitation on the average angle of planing surfaces of fifty (50) degrees. Crowley, U.S. Pat. No. 3,742,888 has side skeg transverse surface angles of almost 70 degrees in attempts to reduce wetted side skeg drag to a minimum. This in turn results in very little side skeg lift for Crowley and an unstable concept that requires special design efforts in other areas in hopes to gain stability. The great advantage of the present embodiment of the Air Ride concept can best be put into perspective by reference to Page 55, FIG. 47 of *High Speed Small Craft*, Second Edition by Peter DuCane, Temple Press Limited, London, 1956. That figure titled "Boundary of planing of flat-bottomed planing surfaces" shows that a deadrise angle of 50 degrees has planing efficiencies of 45 percent while 70 degrees has only 20 percent. This results in two and one quarter as much side to side righting energy for the Air Ride concept, other factors being equal. Note that deadrise angle is the angle that a bottom surface of the hull forms with a line perpendicular to the vertical centerline plane of the hull.

In order to realize highest planing efficiencies while still maintaining some degree of rough water ride quality, a lower limit of five degrees for practical planing angles was set. Planing efficiencies, as presented in the reference by DuCane, are over 90 percent for the 5 degree surface. As a result, other factors being equal, the 5 degree sidehull planing angle offers more than four and one half times the sidehull righting energy as Crowley's side skegs.

The main recess 52 may further be separated into smaller recesses 45, 46 and 47 by secondary bow members 39 and 40. Gas can be supplied to each recess individually through gas supply ducts 42 or discharged at only one or two locations in main recess 52. In the latter case the use of gas passageways such as 38 in a secondary bow such as 39 may be necessary for proper gas distribution throughout the main recess 52. Although only two secondary bow members 39 and 40 are shown in the main recess 52, any number, including none, may be used. Secondary bow members are generally considered essential for the most desirable long fine hull shapes when in rough seas to maintain proper gas pressures in the main recess 52 and to add to vessel stability. The secondary bow members 39 and 40 and aft bow members 41 need not span the full width of the main recess 52 as it is sometimes desirable to have gas flow area on the sides or other portions of those bow members 39, 40 and 41.

It has been found to be very important to have the catamaran sidehull keels 19 and 26 diverge for at least a portion of their length thus providing a finer or narrower entry forward giving best rough sea ride qualities and less gas leakage in a forward direction. For example, the 42 foot air ride hull catamaran keels 19 and 26 are half as far apart forward as they are apart at the transom 27. It is also possible to have the catamaran keels 19 and 26 converge aft to aid in gas flow sealing if desired although this is not shown.

Other desirable features of the inventive hull include at lease one non-trip chine 17 and 24 on each catamaran sidehull 50 and 51 to aid stability in turns. The 42 foot air ride hull incorporates this type of non-trip chine and as a result is extremely manueverable at speed with no tendency to roll or trip in turns. Other concepts such as spray deflection strips at the chine and rounded catamaran sidehull shapes for smoothest ride rather than hard chine are also feasible, although they are not shown in the drawings.

FIG. 3 discloses a longitudinal vertical centerline cross section taken along the line 3—3 of FIG. 2. Shown are forward bow 49, secondary bow members 39 and 40 and aft bow member 41 which together with the starboard catamaran sidehull 51 and starboard sidehull keel 26 define underhull main recess 52 which is made up of smaller recesses 45, 56 and 47. Each of these recesses is relatively shallow in order to use little of main hull 14 internal space, allow rapid repressurization time in the event of partial or full loss of gas pressure in rough sea operation, and have minimum draft requirements when the hull is quiescent with the gas supply off.

Also shown in FIG. 3 are typical gas supply sources, in this case blowers 33 and 34, gas discharge duct outlets 42, and a separate pressure pickup duct 36 and pressure control means 37 used to pressurize the forward recess 45. The use of pressure control means 37 allows variation of pressure in any particular recess or portion of the main recess where a pressure control means 37 is incorporated in a gas supply duct 36. The advantages of this slightly more complicated approach is to allow hull trim control through variation of pressures in individual recesses. Hull trim control can also be accomplished by use of independently controlled drive means on blowers or other gas supply means as connected to different recesses. Blower 34 can be driven by power takeoff from a prime mover engine 35 or independent power means, not shown, as used on blower 33. The prime mover engine 35 typically drives a propeller and shaft assembly 31 with steering provided by rudders 29 although any propulsor means, including air propulsors, can be applied to the air ride inventive hull.

FIG. 4 discloses a transverse port side cross section of a boat hull with the invention as taken along line 4—4 of FIG. 2. The catamaran sidehull 50 non-trip chine 17 is defined by inner 18 and outer 16 chines with the keel 19 being normally the lowest portion of the sidehull 50. It is also possible to place narrow runners, not shown, at or near the catamaran sidehull 50 keel 19 to aid gas sealing and directional stability, however tests conducted on the 42 foot air ride hull show that additional side sealing capability is not necessary even in rough sea operation. Intersection of the secondary bow 39 and the hull is noted as 43 and gas flow passage 38 in the secondary bow 39 is also shown.

FIG. 5 discloses a transverse port side cross section of a boat hull with the invention taken along line 5—5 of FIG. 2 and showing port catamaran hull 50, outer chine 16, catamaran keel 19, with the inner chine 18 and non-trip chine 17 blended into the hull lines at this aft section. Also shown are the recess aft bow 41, bow member hull intersect line 43, and port sheer line 15.

FIG. 6 discloses the bottom view of an alternative version of the inventive hull 14 with inverted-V shaped bow member 49 forward of the main recess 52 that intersects at the main keel 20. The optional secondary bow member 39 shown is also of inverted-V shape which offers a gas trapping cushioned ride effect during wave impact. The downwardly extending catamaran keels 19 and 26 can be seen to be in close proximity at their forward portions. These keels 19 and 26 are water contacting as is shown by waterline 13. The forward inverted-V shaped bow member is defined by hull intersect lines 21 and 22 along with cross member 59 and catamaran keels 19 and 26 at its most forward position where it more resembles a version of the inverted-V that looks like an inverted-U shape and is defined by catamaran keels 19 and 26 and main keel 20 at its intersection with the main recess 52 although other modifications to this bow configuration are feasible and considered within the scope of the invention. The aft bow member 41 is made up of smaller bow members 53 and 54 which house optional waterjet propulsors 30 and 31 that are interconnected by downwardly extending gas sealing members 55 in this instance. Waterjet propulsor 30 and 31 steering and reversing mechanisms are not shown to simplify the drawings.

The catamaran keels 19 and 26 diverge for at least a portion of their length and may further diverge in steps 56 and 57 which is one form of discontinuous fashion as occurs between the forward 45 and aft recess 47 in FIG. 6. Use of more than one step 56 and 57 along the length of catamaran keels 19 and 26 for divergence is also feasible. The use of narrow hull entry shapes forward as made possible by diverging catamaran sidehull keels 19 and 26 results in movement of the center of lift of the hull aft and more over the main gas recess 52 with corresponding better ride qualities as has been proven on the 42 foot air ride hull.

Pressurized gas is supplied through duct outlet 42 in aft recess 47 floor 48. The recess gas flow arrows 32 show how the gas also flows to the forward recess 39 thus providing a large gas area over the entire main recess 52 surface. The main recess 52 is defined at its periphery by load-carrying catamaran sidehulls 50 and 51, diverging keels 19 and 26, forward bow member 49, and aft bow member 41. Hull 14 water contact surfaces, during dynamic calm water operation, are illustrated by hull waterline 13. Intersection with the aft recess floor 48 is shown by hull intersect lines 43 and 44.

FIG. 7 discloses a longitudinal centerline cross section along line 7—7 of FIG. 6 (note that line 7—7 is also the vertical centerline plane). The main recess 52 is made up of forward recess 45 and aft recess 47 and is typically supplied with gas by gas pressurizing devices such as blower 33 through duct port 42. The inlet portion of waterjet propulsor 31 is well submerged thus providing gas free water to the waterjet propulsor 31.

FIG. 8 is a transverse starboard side cross section of a boat hull with the invention taken forward of the main recess 52 and along line 8—8 of FIG. 6. The center inverted-V bow section 49 may intersect the catamaran sidehull keel 26 for simplicity of construction and for inherently strong structural shape where the inverted-V design provides good air trapping ride cushioning effect during rough sea operation. Also shown are the starboard side outer chine 23 and sheer 58.

FIG. 9 is a transverse starboard side view of a boat hull with the invention taken through the forward recess 45 and intersecting the inverted-V secondary bow 39. The inverted-V secondary bow 39 may intersect the starboard catamaran hull 51 keel 26 if desired. The use of a secondary bow 39 in close proximity to the front of the main recess 52 greatly aids forward gas flow sealing during rough sea operation.

FIG. 10 is a transverse starboard side view of a boat hull with the invention taken through the aft recess 47 and intersecting the aft bow member 41 through aft bow section 54. Also shown are gas flow resisting downward sloping sections 55 of aft bow 41, waterjet inlet 31, catamaran sidehull 51 and keel 26, outer chine 23, and sheer 58.

FIG. 11 is a fragmentary bottom view of the aft end of an alternative embodiment of the inventive hull showing an inverted-V aft bow member 41 with hull dynamic calm sea waterline 13, waterjet propulsors 30 and 31, main recess 52, floor 48, gas flow arrows 32, catamaran sidehull 50 and 51, diverging keels 19 and 26, transom 27, and hull intersect lines 43 and 44. The inverted-V bow shape as used for the aft bow 41 here is very desirable for both aft and inside the recess secondary bows because of its simplicity of construction, inherently strong structural shape, and gas cushioning ride effect, however, other shapes including partially flat, round or combinations can be used for secondary and aft bows and considered within the scope of this invention.

FIG. 12 is a port side view of a version of the inventive hull 14 that shows port side anti-skid skeg 64 which in this embodiment contains waterjet inlet 83. Also shown are the sheer 15, transom 27, main keel 20, sidehull 50, inner chine 18, sidehull keel 19, recess steps 81, waterline 13, and waterjet 68. The waterjet 68 is shown without its steering and reversing mechanism to simplify the drawings as waterjet steering and reversing mechanisms are well known in the art.

FIG. 13 is a bottom view of the hull of FIG. 12 which clearly shows both port 64 and starboard 65 anti-skid skegs and their respective integral waterjet inlets 83 and 84. These anti-skid skegs 64, 65 should be located approximately as shown, with their lowermost portions extending over at least a portion of recess length, to be effective for anti-skid turning and gas sealing. Actual boat tests by the applicant has shown that the anti-skid skegs 64 and 65 are very beneficial to prevent dangerous side skidding during turns on air ride vessels that are propelled by non-appendaged propulsors. Nonappendaged propulsors include: waterjets, outdrives, outboards, and aft-of-the-transom surface propellers for example. More conventional inboard propeller drives generally have enough anti-skid capability in the form of shaft and shaft strut appendages. The unique concept proposed here of incorporating high aspect ratio (length to width of opening) waterjet inlets 83 and 84 into the anti-skid skegs 64 and 65 has a threefold benefit. First, the skegs 64 and 65 prevent skidding in turns; second, the waterjet inlets 83 and 84 are submerged deeply enough to practically eliminate gas injection from the gas pressurized recess 52 or from wave action during rough sea operation; and third, a very low drag is achieved due to the high aspect ratio of the waterjet inlets 83 and 84 which maintains a low frontal profile drag value for the skegs 64 and 65. Other ram type waterjet inlet designs would have significantly more drag. Waterjet inlet 83 and 84 aspect ratios of at least 5 to 1 would be used to realize these benefits. The waterjet pumps 68 and 69 are also shown in FIG. 13.

There may also be means to supply pressurized gas to different portions of the recess 52 as illustrated by longitudinal 70 and transverse 71 ducts which have gas discharge holes 72 located herein. These ducts 70 and 71 do not require any particular orientation and may run at angles other than 90 degrees to each other and may also be located above the top or floor of the recess 48; further, a greater or lesser number of ducts may be used and a single plenum located above the top or floor of the recess 48 is also considered within the scope of the present invention. The recess 52 is bounded by catamaran hulls 50 and 51 which contain catamaran keels 19 and 26 and aft non-planar bow member 41, round in this example, which is water contacting on its lowermost portions as shown by waterline 13. Also shown are the lines 43 and 44 where the sidehulls intersect the recess top or floor 48 and steps 81 and 82 that are proximal to the recess 52 and spray rails 85 and 86. The steps 81 and 82 can be any number and greatly add to hull roll stability as well as fore-to-aft stability during dynamic high speed operation. Since the downwardly extending planing steps 81 and 82 are located proximal to the inside of the recess 52 and the areas that are not in water contact receive high pressure recess gas for greatest load carrying or lifting efficiency with minimum wetted area drag. Also shown in FIG. 13 are the hull sheer lines 15 and 58, outer chines 16 and 23, main keel 20, transom 27, dynamic calm sea waterlines 13, inner chines 18 and 25, and hull intersect lines 21 and 22.

FIG. 14 is a longitudinal cross sectional view taken through line 14—14 of FIG. 13 that shows port side skeg 64, waterjet inlet 83 and water diffusion duct 66, waterjet 68, and prime mover engine 35. The centrifugal type waterjet pump 68 shown is more cavitation resistant than conventional axial or mixed flow waterjet pumps and also allows engine 35 installation athwartships. Main keel 20, downwardly extending planing steps 82, transom 27, and dynamic waterlines 13 are also shown.

Further disclosed in FIG. 14 are details of the pressurized gas source and distribution system; these include a powered blower 33, ducts 70 and 71, fore and aft gas flow control vanes 73, transverse gas flow control vanes 74 and their respective actuation mechanisms 78 and 79. The flow control vanes 73 and 74 can be angled other than fore and aft and transversely and a single vane is acceptable. The Air Ride 65 foot crew and supply boat presently under construction uses a single airfoil vane located directly in the blower 33 discharge that is hydraulically actuated from the pilot house to direct pressurized gas either fore or aft; this feature reduces or eliminates the need for expensive and difficult to use water ballast tanks in that vessel. In the version of this invention shown in FIG. 14, the flow directing vanes 73 and 74 are controlled by inputs from a gyroscope control system 74 that senses vessel pitch and roll and gives out control signals to the gas flow distribution valve system 73,74 to stabilize the craft through gas pressure distribution in the recess. Gyroscope control systems are well known in the art of aircraft and missiles. They are commercially available from companies such as Sperry Gyroscope and the like. The gyroscope control system can in turn have inputs from a manual system 76 through connecting lines 77. Actuation of flow directing vanes 73 and 74 or the like can be by servo motors or other standard commercial actuation devices, not shown. Use of this gyroscope control system 75 provides automatic rapid changes in recess 52 pressure distribution to compensate for vessel roll and pitch either due to rough seas or uneven loading.

FIG. 15 is a top view of the inventive hull of FIGS. 12, 13 and 14 that shows particular desirable machinery arrangements. Water inlet diffusion ducts 66 and 67 supply water to waterjets 68 and 69 that are driven by a single engine 35 or individual drive engines, not shown. An optional hydraulic drive motor 60 drives the blower 33 through lines 63 connected to the blower 33 hydraulic motor 61 with blower speed control by a remote control 62. FIG. 18 also shows the vertical hull centerline plane 80.

FIG. 16 is a longitudinal starboard side view taken through line 16—16 of FIG. 13 that shows catamaran keel 26, recess 52, floor or top of recess 48, spray rail 86, and steps 82. These steps 82 greatly add to vehicle stability while underway at high speed and offer minimum drag since their nonwetted portions are supplied with high pressure gas from the recess 52.

FIG. 17 is a transverse starboard side view taken along line 17—17 of FIG. 14 that shows starboard side skeg 65, waterjet inlet 84, portion of the water diffusion duct 67, and fore and aft gas duct 70 under the hull. Also shown are the vertical hull centerline plane 80, sheer 58, outer chine 23, waterline 13 and spray rail 86.

FIG. 18 is a transverse port side view taken along line 18—18 of FIG. 15 that shows the port side waterjet pump and nozzle 68, water inlet diffuser 66, waterjet inlet 83, skeg 64, main engine 35, and blower hydraulic drive motor 60. Also shown are the rounded aft sealing bow member 41, waterline 13, outer chine 23, sheer line 15 and spray rail 85.

FIG. 19 presents a bottom view of a hull 14 that particularly points out multi-bow aft gas sealing members 41, downwardly extending planing steps 81, 82, secondary bow 39, breaks or cutouts 93, 94 in catamaran keels 19, 26 for gas venting, and side skegs 64, 65. It should be noted that this aft bow configuration is preferred for multi-engines driving shafts and propellers 30 with the propellers located under the aft bow members 41 that direct gas flow away from the propellers. Other features and terminology of FIG. 19 are similar to those presented with preceding figures. The sidehulls 50, 51 may optionally be non-symmetrical about a vertical plane containing a catamaran sidehull keel 19, 26 at their forward watercontacting portions as can be seen when the keels 19, 26 are parallel forward of the pressurized gas recess 52.

FIG. 20 is a cross-sectional view of the boat shown in FIG. 19 and shows drive engines 35, propellers and shafts 30, catamaran keel cutout 93, side skeg 65, downwardly extending planing step 82, secondary bow 39, blower 33, rudder 29, and dynamic waterline 12. Location of the propeller and shafts 30 below the aft gas sealing bow members 41 is readily apparent.

FIG. 21 is a vertical transverse view taken through the forward portion of the recess 48 that shows details of the steps 81, 82, dynamic calm sea waterline 12, and spray rails 90. The angles designated by $\theta$ and a subscript are the angles of the planing surfaces of various elements such as the downwardly extending steps 81, 82 and the sidehulls 50, 51. In the case of the sidehulls the planing surface is normally considered to be outboard of the catamaran keels 19, 26. Further, these planing surfaces may be curvilinear in either concave or convex configurations.

FIG. 22 shows a vertical transverse view taken through the aft bow members 41 and shows that they make up at least 25 percent of total recess width when viewed in at least one hull vertical transverse plane where said transverse planes in total substantially equal a maximum outside width of said aft bow members. Also shown are the hull stabilizing and gas sealing recess side skegs 64, 65, outboard spray rails 90, spray rails proximal the recess side of the sidehulls 91, and dynamic calm sea waterline 12.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What is claimed is:

1. In an improved boat hull containing a vertical centerline plane and that is partially supported by a pressurized gas lifting surface including a recess in the underside of the hull, which recess is supplied with pressurized gas from at least one powered gas supply source through at least one gas inlet in fluid communication with the recess, the improvement comprising:

stabilizing catamaran-like sidehulls with forward portions extending downwardly from surfaces of the hull, said sidehull forward portions beginning aft of but disposed proximal to a forward portion of s substantially rigid forward bow member that extends forwardly of the recess, said bow at least in part curvilinear, with the bow and sidehulls having keels which are substantially parallel to each other rearwardly from said forward portions, said sidehull keels diverging aft of said parallel portions; and an additional substantially rigid gas sealing bow member extending over a major portion of recess width, said bow member including at least one surface in part curvilinear and at least partially comprising at least one substantially V-shaped structure.

2. The hull of claim 1 wherein said additional bow member at least partially include angled surfaces, as seen in vertical transverse planes of the hull, that comprise a major portion of the width of said aft bow member.

3. The hull of claim 1 which further comprises a plurality of additonal bow members disposed both aft of the forward bow member and proximal the recess.

4. The hull of claim 3 wherein said additional bow members have angled surfaces that comprise a majority of the width of said additional bow members.

5. The hull of claim 1 wherein said forward bow member includes at least one substantially V-shaped structure.

6. The hull of claim 1 wherein said forward bow member includes at least one substantially inverted-V shaped structure.

7. The hull of claim 1 wherein one or more downwardly extending planing steps are disposed proximal a pressurized recess side of a sidehull, said steps further extending over only a portion of recess width proximal said steps.

8. The hull of claim 1 which further comprises at least one gas flow directing means disposed in a gas supply source main discharge, said gas flow directing means providing an ability to vary pressure in selected portions of the recess.

9. The hull of claim 8 whrein there is at least one gas flow duct located proximal the recess, said gas flow directing means at least in part controlling gas flow through said duct.

10. The hull of claim 1 that has downwardly extending skegs disposed proximal the sides of the recess, said skegs lowermost portions extending over at least a portion of recess length.

11. The hull of claim 10 wherein the skegs contain water inlets.

12. The hull of claim 1 which contains at least one centrifugal waterjet pump mounted with a drive shaft of the waterjet pump proximal to a vertical transverse plane of the hull.

13. The hull of claim 1 wherein the catamaran sidehull keels diverge in a discontinuous manner to expand a width of the pressurized recess.

14. The hull of claim 1 which further comprises at least one spray rail on a side of each catamaran side hull proximal the recess.

15. The hull of claim 1 wherein said sidehull keels diverge by at least fifty (50) percent of the distance between them at their forwardmost watercontacting portions.

16. The hull of claim 1 wherein said sidehull keels are substantially parallel proximal their forwardmost watercontacting portions.

17. In an improved boat hull containing a vertical centerline plane and that is partially supported by a pressurized gas lifting surface including a recess in the underside of the hull, which recess is supplied with pressurized gas from at least one powered gas supply source through at least one gas inlet in fluid communication with the recess, the improvement comprising:

stabilizing catamaran-like sidehulls with forward portions extending downwardly from surfaces of the hull, said sidehull forward portions beginning aft of but disposed proximal to a forward portion of a substantially rigid forward bow member that extends forwardly of the recess, said bow at least in part curvilinear, with the bow and sidehulls having keels which are substantially parallel to each other rearwardly from said forward portions, said sidehulls keels diverging aft of said parallel portions; and an additional substantially rigid gas sealing bow member extending over a major portion of recess width, said bow member including at leat one surface in part curvilinear and at least including at least one surface in part curvilinear and at least partially comprising at least one substantially inverted V-shaped structure.

18. The hull of claim 17 wherein said additional bow member at least partially include angled surfaces, as seen in vertical transverse planes of the hull, that comprise a major portion of the width of said aft bow member.

19. The hull of claim 18 wherein said additional bow member has angled surfaces that comprise a majority of the width of said additional bow member.

20. The hull of claim 17 wherein said forward bow member includes at least one substantially V-shaped structure.

21. The hull of claim 17 wherein said forward bow member includes at least one substantially inverted-V shaped structure.

22. The hull of claim 17 wherein one or more downwardly extending planing steps are disposed proximal a pressurized recess side of a sidehull, said steps further extending over only a portion of recess width proximal said steps.

23. The hull of claim 17 which further comprises at least one gas flow directing means disposed in a gas supply source main discharge, said gas flow directing means providing an ability to vary pressure in selected portions of the recess.

24. The hull of claim 23 wherein there is at least one gas flow duct located proximal the recess, said gas flow directing means at least in part controlling gas flow through said duct.

25. The hull of claim 17 that has downwardly extending skegs disposed proximal the sides of the recess, said skegs lowermost portions extending over at least a portion of recess length.

26. The hull of claim 25 wherein the skegs contain water inlets.

27. The hull of claim 17 which contains at least one centrifugal waterjet pump mounted with a drive shaft of the waterjet pump proximal to a vertical transverse plane of the hull.

28. The hull of claim 17 wherein the catamaran sidehull keels diverge in a discontinuous manner to expand a width of the pressurized recess.

29. The hull of claim 17 which further comprises at least one spray rail on a side of each catamaran side hull proximal the recess.

30. The hull of claim 17 wherein said sidehull keels diverge by at least fifty (50) percent of the distance between them at their forwardmost watercontacting portions.

31. The hull of claim 17 wherein said sidehull keels are substantially parallel proximal their forwardmost watercontacting portions.

* * * * *